United States Patent [19]
Seksaria et al.

[11] Patent Number: 5,931,520
[45] Date of Patent: Aug. 3, 1999

[54] LIGHT WEIGHT INSTRUMENT PANEL REINFORCEMENT STRUCTURE

[75] Inventors: Dinesh C. Seksaria, Novi, Mich.; John W. Cobes, Lower Burrell, Pa.; Richard A. Michael, Greenbush, Mich.

[73] Assignee: Aluminum Company of America, Pittsburgh, Pa.

[21] Appl. No.: 08/995,291

[22] Filed: Dec. 19, 1997

[51] Int. Cl.$^6$ .................................................. B62D 25/14
[52] U.S. Cl. ........................ 296/70; 296/72; 296/203.02; 280/752
[58] Field of Search ............................. 296/70, 72, 192, 296/194, 203.02; 180/90; 280/779, 752

[56] References Cited

U.S. PATENT DOCUMENTS

| | | | |
|---|---|---|---|
| 2,072,655 | 3/1937 | Tjaarpa | 180/90 |
| 4,362,319 | 12/1982 | Masami et al. | 280/779 |
| 4,432,565 | 2/1984 | Suzuki et al. | 280/779 |
| 4,560,186 | 12/1985 | Onitsuka et al. | 280/752 |
| 4,709,943 | 12/1987 | Yoshimura et al. | 180/90 X |
| 5,238,286 | 8/1993 | Tanaka et al. | 296/70 |
| 5,244,745 | 9/1993 | Seksaria et al. | 428/593 |

FOREIGN PATENT DOCUMENTS

| | | | |
|---|---|---|---|
| 640512 | 3/1995 | European Pat. Off. | 280/748 |
| 4211964 | 10/1993 | Germany | 280/748 |
| 4232846 | 3/1994 | Germany | 280/779 |
| 406199152 | 7/1994 | Japan | 180/90 |

*Primary Examiner*—Dennis H. Pedder
*Attorney, Agent, or Firm*—Glenn E. Klepac

[57] ABSTRACT

A light weight, structurally stiff instrument panel reinforcement structure for motor vehicle bodies. The reinforcement structure includes driver side and passenger side cross tubes that are preferably aluminum alloy extrusions, and a center stack support that is preferably a magnesium alloy casting connecting the cross tubes. The driver side cross tube supports a steering column assembly. A knee bolster is connected by two metal crush tubes to the driver side cross tube. Two metal crush tubes connect a glove box door frame to the passenger side cross tube. The instrument panel reinforcement structure offers about a 40% weight saving compared with similar systems made with steel components.

23 Claims, 9 Drawing Sheets

LIGHT WEIGHT INSTRUMENT PANEL REINFORCEMENT STRUCTURE

FIELD OF THE INVENTION

The present invention relates to an instrument panel reinforcement structure for motor vehicles. The reinforcement structure extends between two front pillars and supports a steering column, a glove box, a passenger side air bag and various other instrument panel components.

BACKGROUND OF THE INVENTION

The instrument panel reinforcement structure is the part of a motor vehicle extending between left and right front pillars in front of the passenger compartment. Various components mounted on the instrument panel reinforcement structure include the steering column assembly, a glove box, a passenger side air bag, an instrument cluster, an entertainment/information system, a heating/ventilation/air conditioning unit with associated ducts, a wire harness, electrical modules and fascia. The inclusion of driver side air bags and the locating of some controls in the steering column assembly have caused it to gain weight and to grow in size.

Passenger vehicles have been made safer in recent years through the use of safety devices such as seat belts and air bags. In addition, automobile manufacturers are making the body and its associated components more energy absorbent in the event of a collision. The United States government has also established a set of Motor Vehicle Safety Standards mandating certain other minimum vehicle safety requirements.

In the prior art, some attempts have been made to provide instrument panel structural reinforcement assemblies for motor vehicles. However, the prior art assemblies generally suffer from one or more serious disadvantages making them less than entirely suitable for their intended purpose. For example, steel assemblies have been used for some time but they add considerable weight to vehicle bodies. Accordingly, there is a need for an alternative to steel instrument panel assemblies.

Tanaka U.S. Pat. No. 5,238,286 describes an instrument panel structure for an automotive vehicle. The structure includes a transversely extending support member in the form of an elongated pipe. The support member holds up a steering apparatus and a knee protector for relieving shocks applied to a driver's knees in a collision. The support member is a single pipe extending between the front support pillars. The pipe is bent on the passenger's side and reinforced on the driver's side by an internal reinforcing pipe for resisting deformation of the support member caused by forward swinging of the steering apparatus in a collision.

A principal objective of our invention is to provide a light weight instrument panel reinforcement structure for motor vehicles that has enhanced structural stiffness in order to minimize steering column vibrations.

A related objective of the present invention is to provide an instrument panel reinforcement structure for motor vehicles made from aluminum alloy and magnesium alloy components. The reinforcement structure of the present invention offers about a 40% weight saving compared with similar systems having steel components. The preferred reinforcement structure shown and described herein weighs only about 18 pounds (7.7 kg).

Another objective of the invention is to provide a light weight instrument panel reinforcement structure that consumes little additional cockpit space and is inexpensive to manufacture and to install on a mass production assembly line.

A further objective of our invention is to provide an instrument panel reinforcement structure that adapts easily to left and right hand drive cars and accommodates different steering column orientations.

One important advantage of our invention is that it has a common base structure adaptable to a variety of different designs by addition or swapping of components, thereby reducing effort, time and cost required for engineering the instrument panel structural system.

Additional objectives and advantages of our invention will become apparent to persons skilled in the art from the following detailed description.

SUMMARY OF THE INVENTION

In accordance with the present invention there is provided a light weight instrument panel reinforcement structure for inclusion in a motor vehicle body having a floor panel and several pillars extending upwardly from the floor panel. The reinforcement structure extends between the left and right front pillars in front of the passenger compartment. The reinforcement structure supports a steering column, a glove box, a passenger side air bag and various other instrument panel components.

A preferred instrument panel reinforcement structure comprises a passenger side cross tube and a driver side cross tube connected by a center stack support. The cross tubes are preferably connected to the front pillars through bracket means or metal brackets. The center stack support is preferably connected to the floor panel. Mounting tubes attached to the driver side cross tube support the steering column. The passenger side air bag support is attached to the passenger side cross tube. A driver side knee bolster is connected to the driver side cross tube through metal crush tubes. Metal crush tubes also connect a glove box door frame to the passenger side cross tube.

The driver side cross tube and the passenger side cross tube are preferably aluminum alloy extrusions. Aluminum alloys of the Aluminum Association (AA) 6000 series are preferred although other alloys may also be used. The AA 6000 alloys generally contain about 0.2–2 wt. % silicon and about 0.2–2 wt. % magnesium. These aluminum alloys usually also contain other alloying elements and some impurities. Our particularly preferred cross tubes are made with an AA 6063 T4 alloy containing about 0.2–0.6 wt. % Si, 0.45–0.9 wt. % Mg, 0.35 wt. % max. Fe, 0.10 wt. % max. Cu, Cr, Zn and Ti, remainder Al, incidental elements and impurities.

A particularly preferred driver side cross tube is extruded as a hollow oval having a 120×60 mm cross-section with an average 5 mm wall thickness. The extruded cross tube is hydroformed in a middle portion to provide a generally triangular cross section with a flat bottom surface appropriately oriented for attachment of two steering column support tubes. The cross tube also includes two openings for crush tubes contacting a driver side knee bolster. The steering column support tubes are preferably AA 6063-T4 aluminum alloy extrusions having a wall thickness of about 5 mm. A particularly preferred passenger side cross tube is a hollow cylinder having an outer diameter of about 60 mm and a wall thickness of about 3 mm. The driver side cross tube and the passenger side cross tube both extend laterally or in a cross-car direction, on opposite sides of a center stack support.

The driver side cross tube is preferably hydroformed by a process that includes pressurizing the tube internally with an incompressible fluid at sufficient pressure to deform the middle portion. The incompressible fluid is preferably water at a pressure of about 100–5,000 psi, more preferably about 1,000–3,000 psi. A die outside the middle portion and the pressurized water force the middle portion into a generally triangular cross section while the end portions retain their original, oval cross-sectional shape. The hydroformed driver side cross tube still has continuous internal and external surfaces.

The generally triangular middle portion has a larger radius of gyration than the end portions. Accordingly, the driver side cross tube has excellent resistance to twisting, even after a steering column is attached.

The center stack support is preferably a magnesium alloy casting having a complex shape that includes several walls having an average thickness of about 2.5 mm. The center stack support includes a first sleeve defining a first opening for the first wall on the passenger side cross tube, and a second sleeve defining a second opening for the second wall on the driver side cross tube. Each sleeve includes several ridges extending radially inwardly of the sleeve wall. The sleeve walls, ridges and tube walls, in combination, define spaces for a polymeric adhesive binding the tubes to the center stack support.

The crush tubes are preferably cold drawn from an AA 6000 alloy, more preferably an AA 6061 T4 alloy. The crush tubes each include a wall having a thickness of less than about 1.0 mm. The crush tubes have an outer diameter of about 30 mm and a wall thickness of about 0.7 mm in a particularly preferred embodiment. The crush tubes are inserted into openings in the cross tubes and then welded around the openings. The crush tubes preferably include one or more circumferentially extending buckle initiators that are preferably mechanically formed indentations extending around the entire circumference. The buckle initiators facilitate folding of the crush tubes in an accordion-like manner when impact occurs with an occupant's knees.

Two crush tubes connect the driver side knee bolster to the driver side cross tube. The knee bolster is preferably made from aluminum alloy sheets. A particularly preferred knee bolster includes a generally planar first metal sheet and a second metal sheet defining several cup-shaped indentations. The indentations have generally flat portions adjacent the first metal sheet. Additional details of construction of a particularly preferred knee bolster are shown in Seksaria et al. U.S. Pat. No. 5,244,745 issued Sep. 14, 1993 and entitled "Structural Sheet and Panel", the disclosure of which patent is incorporated herein by reference to the extent consistent with the present invention.

Two other crush tubes connect the passenger side cross tube with the glove box door frame. A glove box door hinged to the frame acts as a knee bolster on the passenger side. The instrument panel reinforcement structure comprises at least two hollow metal crush tubes connecting a knee bolster to at least one of the driver side cross tube and the passenger side cross tube.

End portions of the passenger side and driver side cross tubes are attached to front hinge pillars through metal end brackets or bracket means. The end brackets are preferably stamped from aluminum alloy sheet material having a thickness of about 4 mm. The end brackets are welded to the cross tubes and then attached to the hinge pillars by metal fasteners extending through openings in both the brackets and in the hinge pillars.

BRIEF DESCRIPTION OF THE DRAWINGS

FIG. 11A is a cross-sectional view taken along the lines 11A—11A of FIG. 11.

DETAILED DESCRIPTION OF PREFERRED EMBODIMENTS

Figure 1:
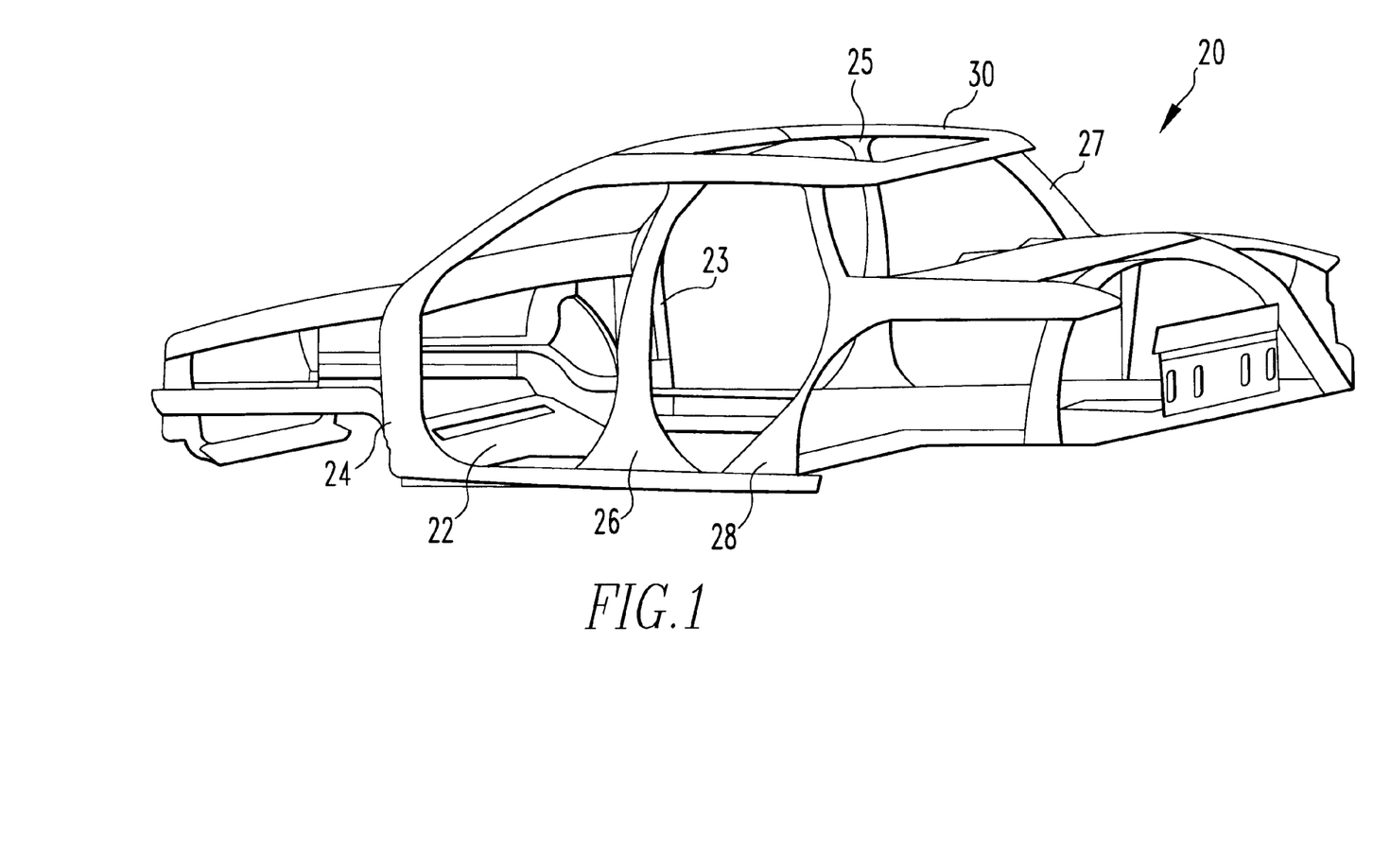
FIG. 1 is a fragmentary perspective view of a motor vehicle body of our invention.

The instrument panel reinforcement structure of our invention comprises a secondary structure attached to a motor vehicle body 20, as shown in FIG. 1. The vehicle body 20 includes a floor or floor panel 22, right and left front pillars 23, 24, right and left middle pillars 25, 26 and right and left rear pillars 27, 28. The pillars 23, 24, 25, 26, 27, 28 extend upwardly from the floor 22, supporting a roof 30. The reinforcement structure extends between the two front pillars 23, 24 and supports a steering column, a glove box, a passenger side air bag and various other instrument panel components. Some of the instrument panel components may be covered with plastic, wood or leather fascia (not shown).

Figure 2:
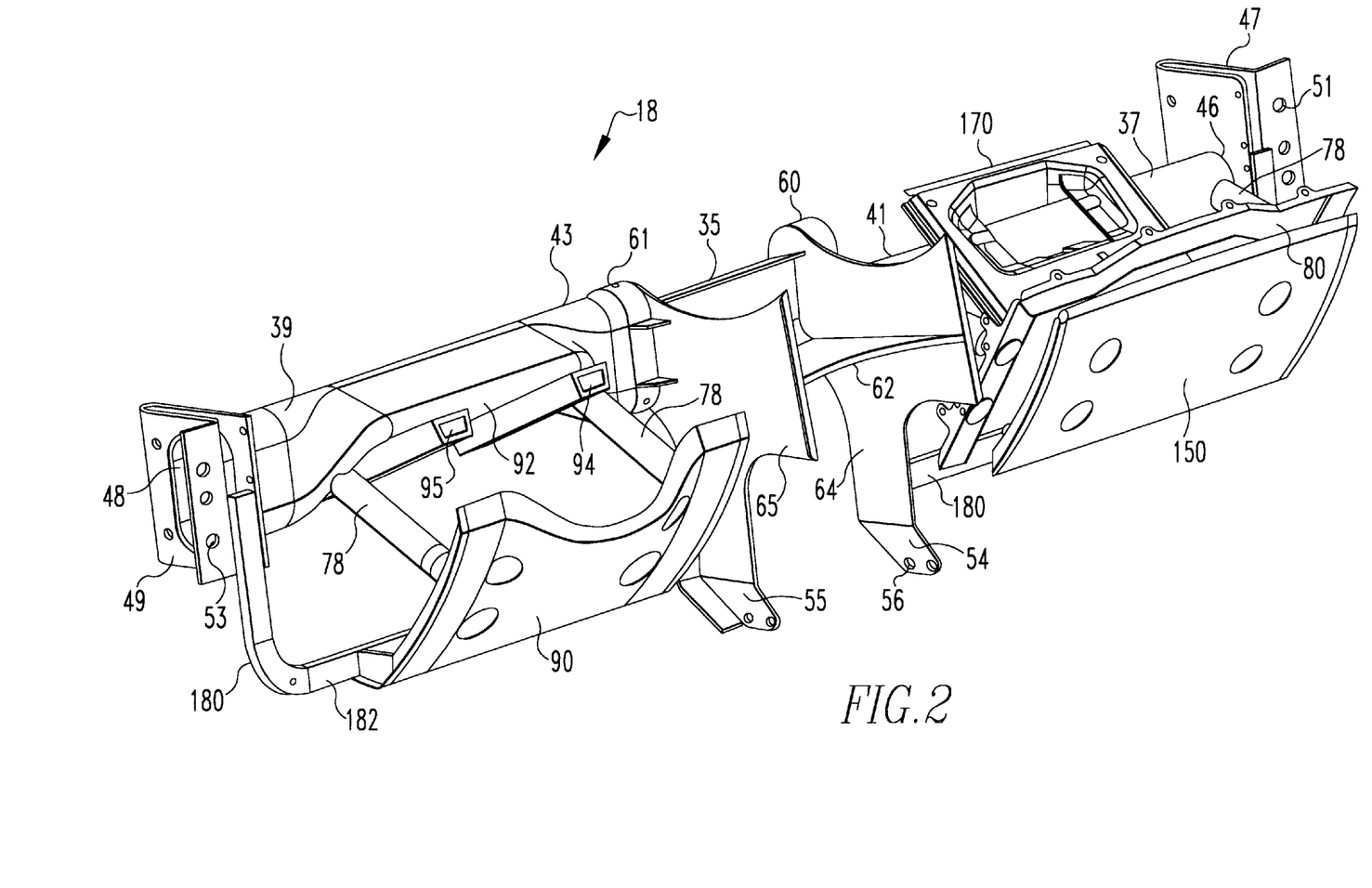
FIG. 2 is a perspective view of an instrument panel reinforcement structure of the present invention.

Referring now to FIG. 2, there is shown an instrument panel reinforcement structure 18. The structure 18 includes a center stack support 35 connected on lateral sides with a passenger side cross tube 37 and a driver side cross tube 39. The center stack support 35 is a magnesium alloy casting. The passenger side cross tube 37 and the driver side tube 39 are hollow, aluminum alloy extrusions. The passenger side cross tube 37 has a laterally extending first wall 41 and the driver side cross tube 39 has a laterally extending second wall 43.

Figure 3:
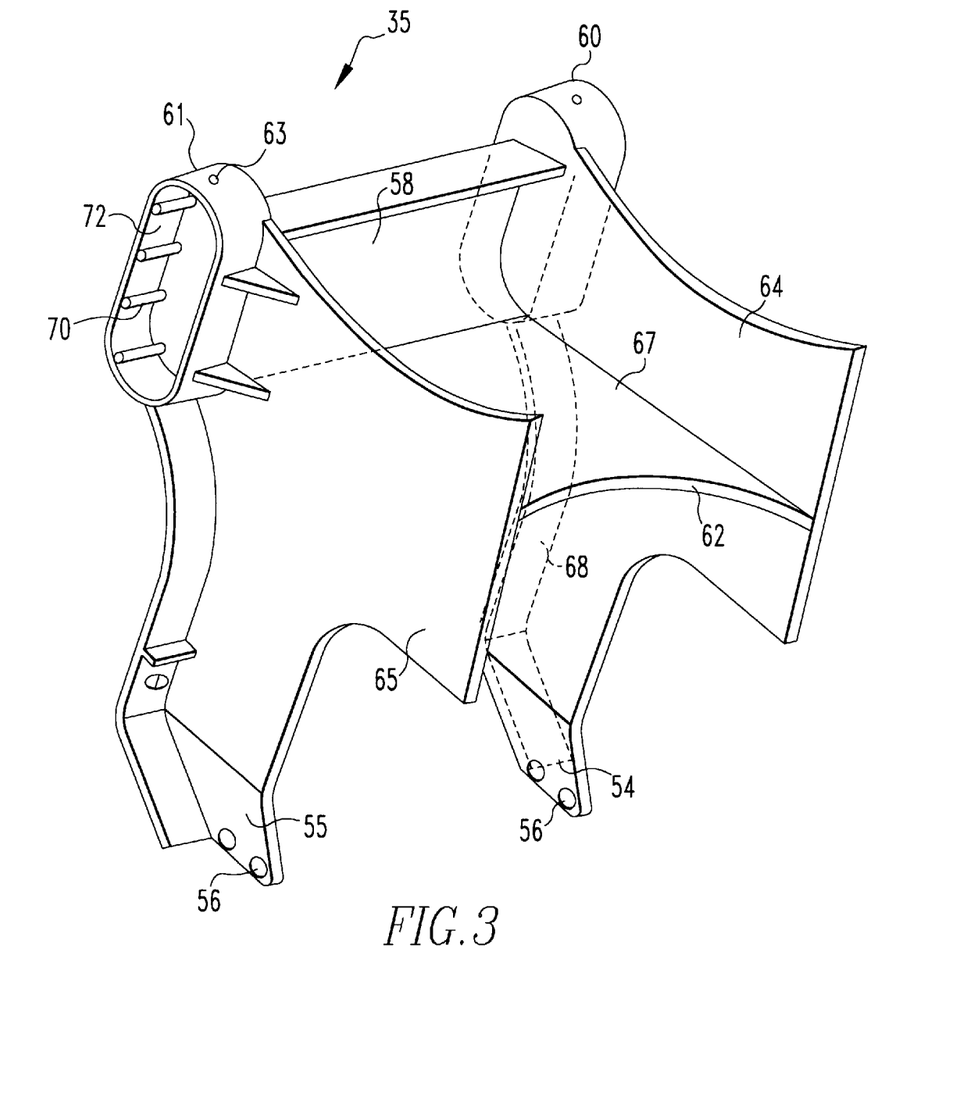
FIG. 3 is a perspective view of a metal center stack support.

The passenger side cross tube 37 has a right end portion 46 connected to a right hinge pillar bracket 47. The driver side cross tube 39 has a left end portion 48 connected to a left hinge pillar bracket 49. The brackets 47, 49 each define through openings 51, 53 for bolts (not shown) or other through fasteners connecting the brackets 47, 49 to the front pillars 23, 24. As shown in FIGS. 2 and 3, the center stack support 35 includes a pair of bottom flanges 54, 55 each defining through openings 56 for bolts (not shown) or other through fasteners for connecting the support 35 to the floor 22.

The center stack support 35 is an AM60B magnesium alloy casting in the particularly preferred embodiment described herein. The support 35 includes a front wall 58 extending between right and left oval sleeves 60, 61. The front wall 58 is joined to a shelf 62 and right and left side walls 64, 65 connected with the flanges 54, 55. The front wall 58, shelf 62 and side walls 64, 65 define a rearwardly opening upper compartment 67 for a radio and cassette deck (not shown) or other entertainment/information system. A lower compartment 68 below the shelf 62 accommodates the heating/ventilation/air conditioning unit. The front wall 58, shelf 62, sleeves 60, 61 and side walls 64, 65 have an average wall thickness of approximately 2.5 mm (0.1 inch).

Figure 4:
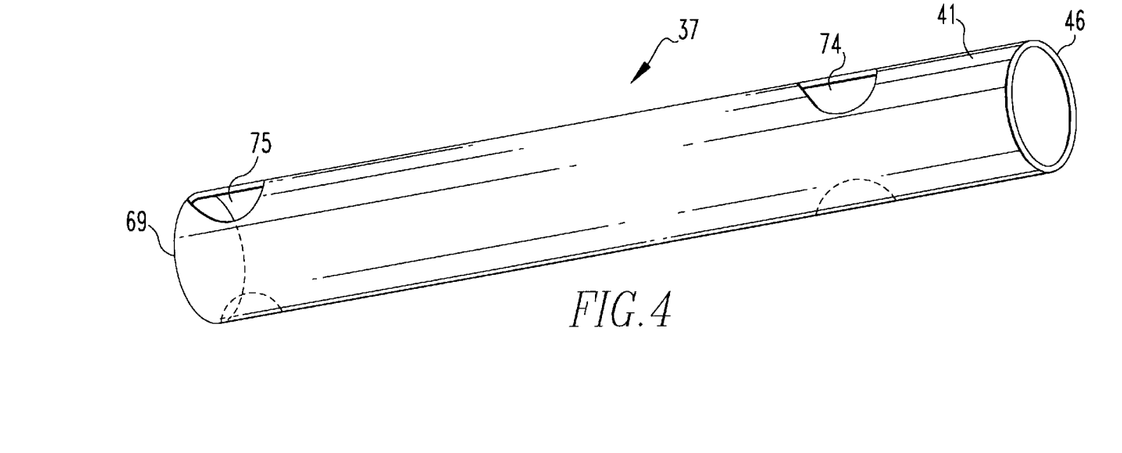
FIG. 4 is a perspective view of a passenger side cross tube.

Referring now to FIGS. 2 and 4, the passenger side cross tube 37 is a generally cylindrical aluminum alloy extrusion having a laterally extending first wall 41. The cross tube 37 is made from an AA6063 T4 aluminum alloy. The cross tube 37 has an outer diameter of about 60 mm (2.4 inches) and the first wall 41 has a thickness of about 2.8 mm (0.11 inch). The cross tube 37 has a right end portion 46 welded to the right hinge pillar bracket 47 and a left end portion 69 nested in a first sleeve 60 on the center stack support 35. As shown in FIG. 3, the sleeve walls 60, 61 each include several radially inwardly extending ridges 70. The ridges 70 abut against walls 41, 43 of the tubes 37, 39. Connections between the sleeve walls 60, 61 and the tube walls 41, 43 are also stabilized by through fasteners (not shown). For example, a bolt or other through fastener extends through an opening 63 in the center stack support sleeve 61 and a hole 85 in the wall 43 of the driver side cross tube end portion 84. The sleeve walls 60, 61 combine with the ridges 70 and tube walls 41, 43 to form several pockets 72 for an epoxy adhesive. One important advantage of our invention is that the adhesive in pockets 72 dampens vibrations transmitted through the center stack support 35 to the driver side cross tube 39. Accordingly, vibrations transmitted by the reinforcement structure 18 to the steering column assembly have reduced intensity compared with an instrument panel reinforcement structure including only a single tube extending between the front pillars 23, 24.

As shown in FIG. 4, the passenger side cross tube 37 defines two pairs of aligned holes 74, 75. Each pair of holes 74, 75 accommodates a crush tube 78 attached to a glove box door frame 80, as shown in FIG. 2.

Figure 5:
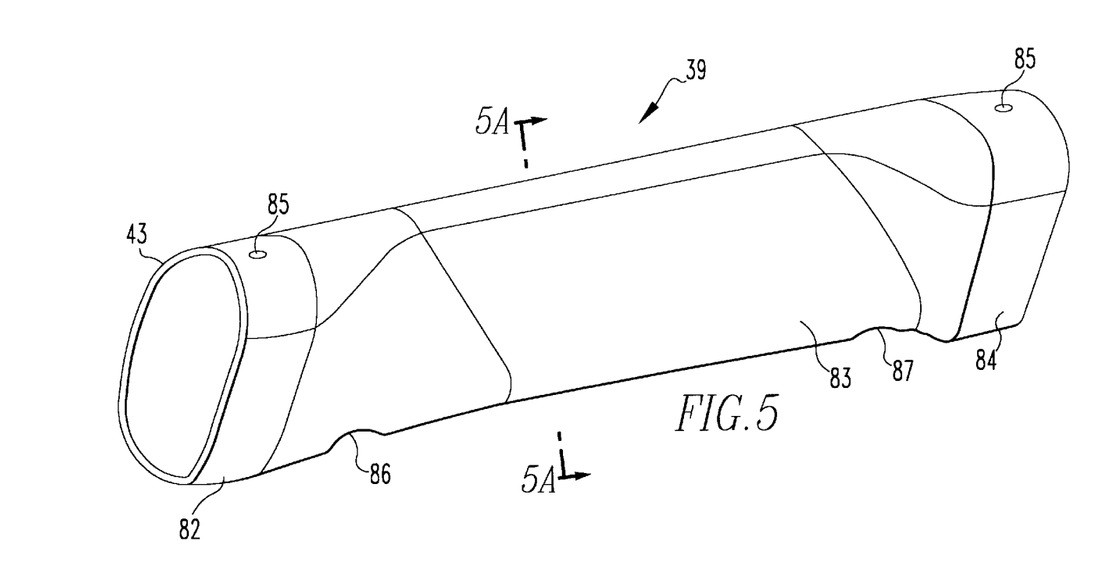
FIG. 5 is a perspective view of a driver side cross tube.

As shown in FIGS. 2 and 5, the driver side cross tube 39 is a laterally extending aluminum alloy extrusion including a second wall 43 having a thickness of about 5 mm (0.2 in). The cross tube 39 is made from an AA6063 T4 aluminum alloy. The cross tube 39 has end portions 82, 84 that are generally oval in transverse section with outer dimensions of about 120 mm ×60 mm. The left end portion 82 is welded to the left hinge pillar bracket 49 and the right end portion 84 is attached to a sleeve 61 in the center support 35.

Figure 5A:
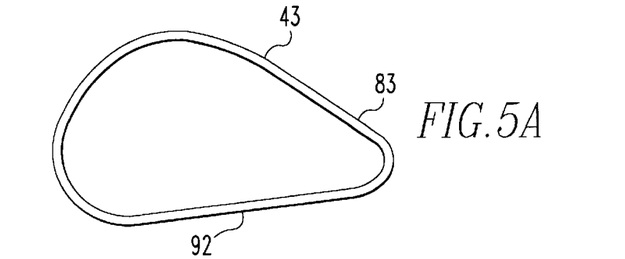
FIG. 5A is a cross-sectional view taken along the lines 5A—5A of FIG. 5.

The cross tube 39 is formed with two laterally spaced holes 86, 87 for crush tubes 78 supporting the driver side knee bolster 90. As shown in FIG. 5A, the cross tube 39 is hydroformed so that a middle portion 83 between the end portions 82, 84 has a generally flat bottom surface 92. Two steering column assembly support tubes 94, 95 are secured to the bottom surface 92 by a combination of metal bolts and adhesive bonding.

One important advantage of our invention is that the cross tubes 37, 39 are manufactured from hollow, generally cylindrical aluminum alloy extrusions. These closed aluminum alloy shapes provide excellent stiffness in a small volume, with less weight than steel. In addition, spanning the car width with two separate cross tubes rather than only one concentrates greater strength and stiffness in the driver side cross tube 39, with greater wall thickness than the passenger side cross tube 37.

The hydroformed driver side cross tube 39 has a generally triangular cross-section in the middle portion 83 and a generally oval shape in the end portions 82, 84. The middle portion 83 has a larger radius of gyration than the end portions 82, 84. Accordingly, the cross tube 39 resists twisting after a steering column is attached.

Figure 6:
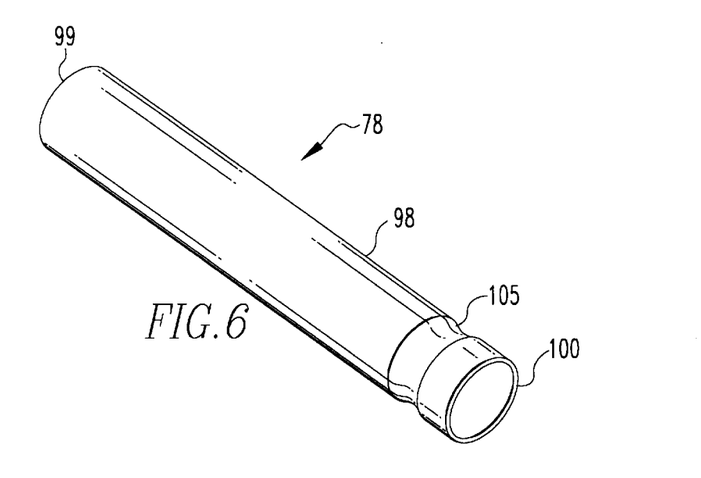
FIG. 6 is a perspective view of a metal crush tube.

One of the metal crush tubes 78 is shown in FIG. 6. The crush tube 78 has a generally cylindrical wall 98 having an outer diameter of about 30 mm and a thickness of about 0.7 mm. A front end portion 99 is attached to one of the cross tubes 37, 39 and a rear end portion 100 is attached to the glove box door frame 80 or the knee bolster 90. A portion of the wall 98 is crimped to form an area 105 of reduced diameter that acts as a buckle initiator in frontal collisions.

Figure 7:
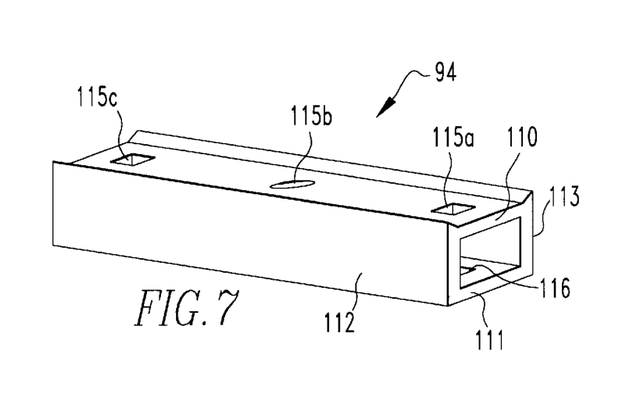
FIG. 7 is a perspective view of a steering column support beam.

One of the steering column assembly support tubes 94 is shown in FIG. 7. The support tube 94 has a top wall 110 and a bottom wall 111 interconnected by side walls 112, 113. The top wall 110 defines three apertures 115a, 115b, 115c aligned with apertures 116 in the bottom wall 111, for three metal bolts or other through fasteners (not shown) connecting the bracket 94 to the driver side cross tube 39. In addition, the support tubes 94 are bonded to the cross tube 39 by an adhesive layer (not shown) between the bottom wall 92 of the cross tube 39 and the top wall 110 of the support tubes 94. The support tube 94 is a 6063 T4 aluminum alloy extrusion having a wall thickness of about 5 mm (0.2 in).

Figure 8:
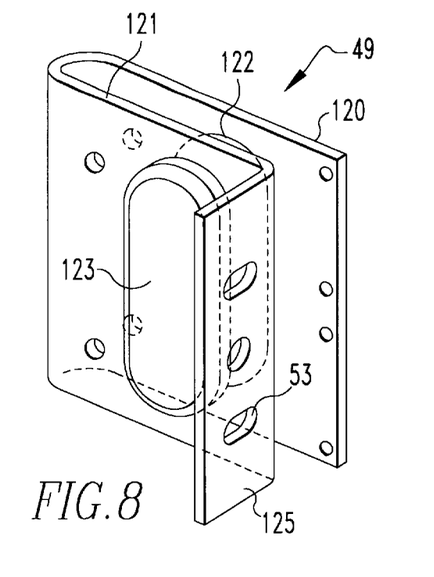
FIG. 8 is a perspective view of a driver side hinge pillar bracket.

The left hinge pillar bracket 49 is shown in greater detail in FIG. 8. Two principal panels 120, 121 define axially aligned oval openings 122, 123 for the left end portion of the driver side tube. A web 125 extending laterally outwardly from the left principal panel 121 defines three openings 53 for bolts (not shown) fastening the bracket 49 to the left hinge pillar.

Figure 9:
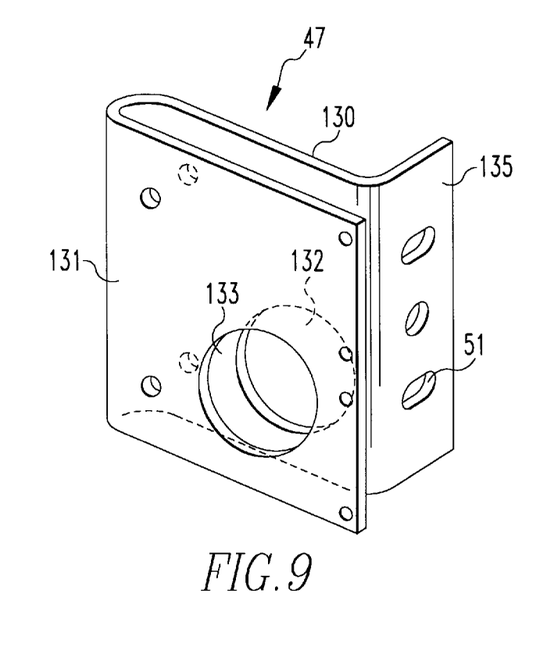
FIG. 9 is a perspective view of a passenger side hinge pillar bracket.

The right hinge pillar bracket 47 is shown in greater detail in FIG. 9. Two principal panels 130, 131 define axially aligned round openings 132, 133 for the right end portion 46 of the passenger side tube 37. A laterally directed web 135 extending from the right panel 130 defines three openings 51 for bolts (not shown) or other through fasteners, connecting the bracket 47 to the right hinge pillar.

The hinge pillar brackets 47, 49 are stamped from sheets of an AA 6000 series aluminum alloy and then formed into the shapes shown in FIGS. 8 and 9. Their thickness is about 4 mm (0.16 in).

Figure 10:
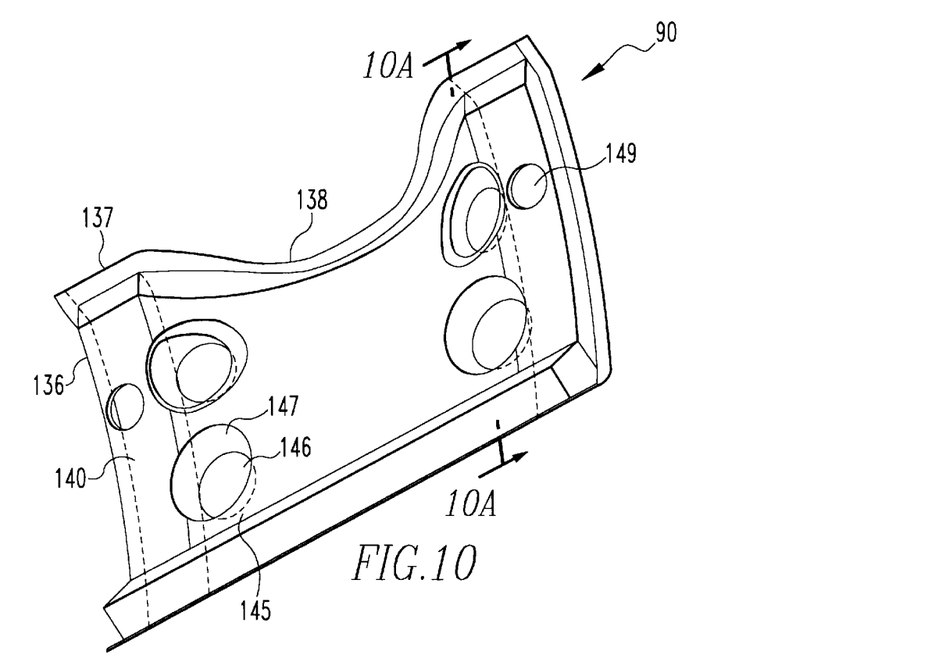
FIG. 10 is a perspective view of a driver side knee bolster.
Figure 10A:
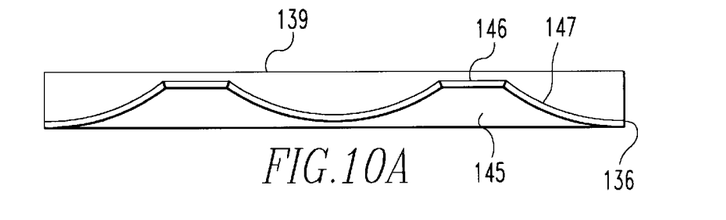

The driver side knee bolster 90 is shown in greater detail in FIGS. 10 and 10A. The knee bolster 90 includes a generally rectangular first sheet 136 joined with a generally rectangular second sheet 139. The first sheet 136 has an upper edge 137 formed with a downwardly recessed portion 138 to accommodate the steering column. The sheet 136 includes a generally planar principal portion 140 formed with four generally cup-shaped spaced elements 145 each having a generally flat top portion 146 and sidewall portions 147 formed by a sigmoidal line of revolution. The sidewall portions 147 blend smoothly with the top portions 146 and principal portion 140, thereby avoiding stress concentrations in the elements 145. The sheet 136 also includes two laterally spaced depressions 149 extending rearwardly of the principal portion 140. The depressions 149 contact rear end portions of the crush tubes.

Figure 11:
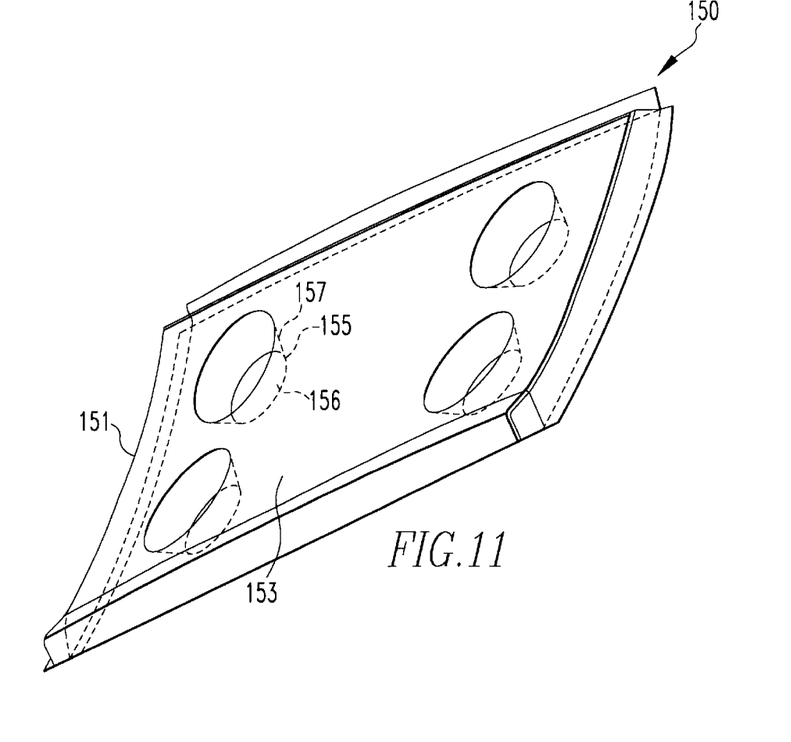
FIG. 11 is a perspective view of a passenger side glove box door.

The glove box door 150 is shown in FIG. 11. The door 150 is a generally rectangular sheet 151 including a generally planar principal portion 153 formed with four generally cup-shaped elements 155. The elements 155 each have a generally flat top portion 156 and sidewall portions 157 formed by a sigmoidal line of revolution. The sidewall portions 157 blend smoothly with the top portions 156 and principal portion 153, thereby avoiding stress concentrations in the elements 155. The glove box door 150 is attached to a frame 80, as shown in FIG. 2.

Figure 13:
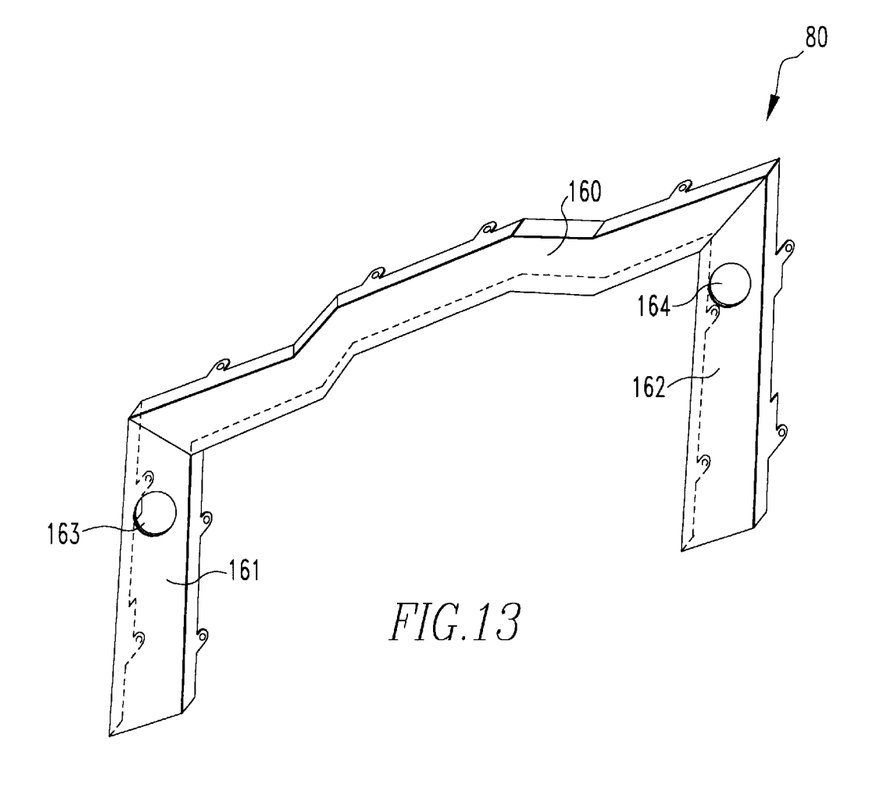
FIG. 13 is a perspective view of a glovebox door frame.

The glove box door frame 80 is shown in greater detail in FIG. 13. The frame 80 includes a laterally extending upper portion 160 and two legs 161, 162 extending downwardly from lateral ends of the upper portion 160. The legs 161, 162 are formed with rearwardly extending depressions 163, 164. The depressions 163, 164 are welded to rear end portions of the crush tubes 78 as shown in FIG. 2.

Figure 12:
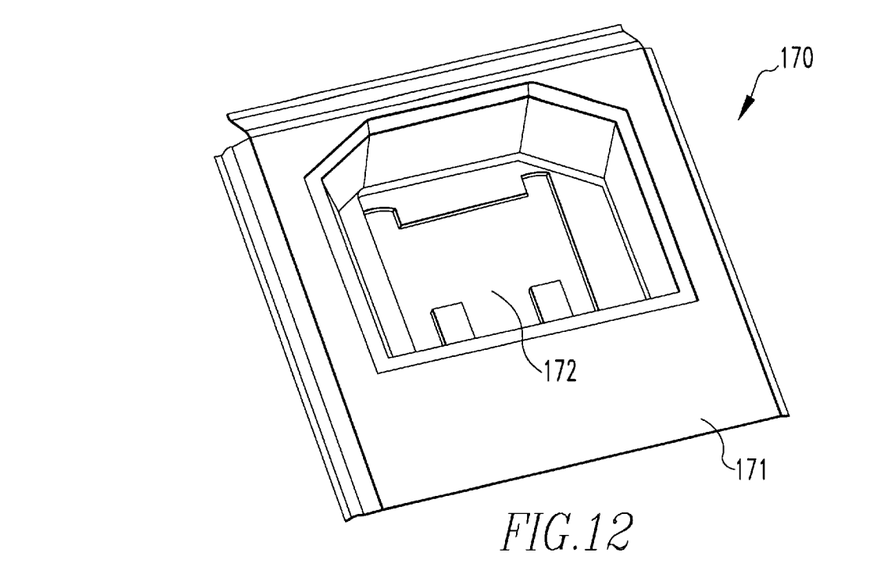
FIG. 12 is a perspective view of a passenger side airbag housing support.

As shown in FIG. 2, the passenger side cross tube 37 carries a support platform 170 for the air bag housing. Referring now to FIG. 12, the platform 170 includes a generally planar main panel 171 and a recessed portion 172 offset forwardly from the main panel 171.

Figure 14:
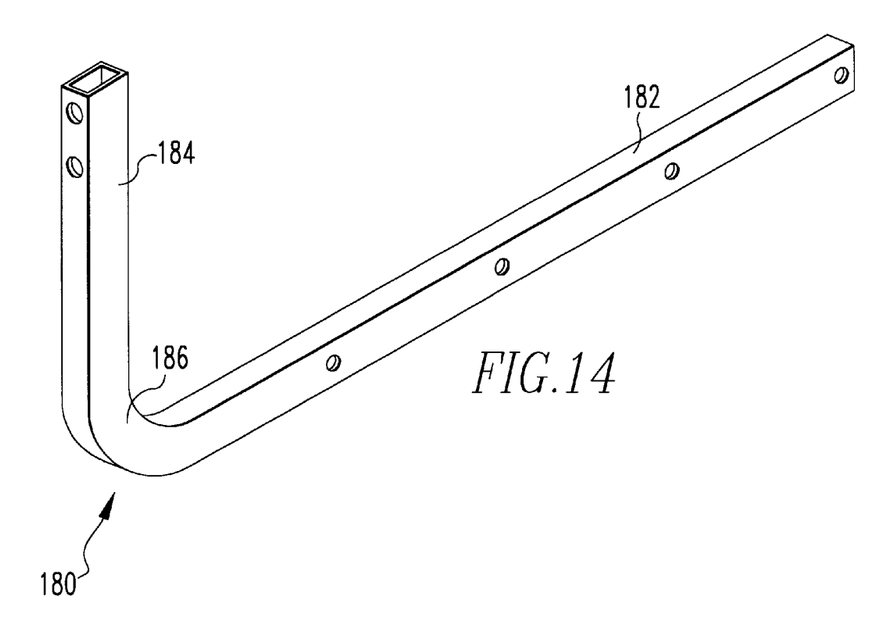
FIG. 14 is a perspective view of a lower support tube.

As shown in FIG. 2, a passenger side support lower support tube 180 extends between the passenger side hinge pillar bracket 47 and the center stack support 35. The glove box frame 80 is attached to a laterally extending base 182. The lower support tube 180, shown in greater detail in FIG. 14, is an extruded hollow tube bent at an elbow 186 between a laterally extending base 182 and an upwardly extending arm 184. The bracket 180 is an aluminum alloy extrusion.

Referring again to FIG. 2, a driver side support bracket 180 extends between the left hinge pillar bracket 49 and the center stack support 35. The driver side knee bolster 90 is fixed to a laterally extending base 182 of the support bracket 180. The support bracket 180 is an aluminum alloy extrusion, as shown in greater detail in FIG. 14.

The knee bolster 90, glove box door 150 and glove box door frame 80 are each made from sheets of an AA 5000 series aluminum alloy having a thickness of about 1.5 mm (0.06 in). The knee bolster 90 and glove box door 150 are made in accordance with Seksaria et al U.S. Pat. No. 5,244,745 issued Sep. 14, 1993, the disclosure of which is incorporated by reference.

Having described the presently preferred embodiments, it is to be understood that the invention may be otherwise embodied within the scope of the appended claims.

What is claimed is:

1. An instrument panel reinforcement structure for use in a vehicle body having a floor panel and a plurality of pillars extending from said floor panel, said reinforcement structure comprising:
    (a) a passenger side cross tube comprising a hollow metal extrusion having a laterally extending first wall;
    (b) a driver side cross tube spaced laterally from said passenger side cross tube and comprising a single hollow metal extrusion having a laterally extending second wall thicker than said first wall, said driver side cross tube comprising end portions each having a generally oval cross section and a middle portion between the end portions, said middle portion having a generally triangular cross section; and
    (c) a center stack support between said passenger side cross tube and said driver side cross tube, said center stack support defining a first opening for connection with said first wall and a second opening for connection with said second wall.

2. The reinforcement structure of claim 1 wherein said first wall and said second wall each comprise an aluminum alloy of the AA 6000 series.

3. The reinforcement structure of claim 1 wherein said first wall and said second wall each comprise an aluminum-silicon-magnesium alloy of the AA 6000 series containing about 0.2–0.6 wt. % Si, 0.45–0.9 wt. % Mg and 0.35 wt. % max. Fe.

4. The reinforcement structure of claim 1 wherein said center stack support comprises a metal casting.

5. The reinforcement structure of claim 1 wherein said center stack support comprises a magnesium alloy casting.

6. The reinforcement structure of claim 1 wherein said center stack support is generally symmetrical about a longitudinally extending center plane.

7. The reinforcement structure of claim 1, further comprising:
    (d) at least one knee bolster comprising a metal sheet; and
    (e) at least two hollow metal crush tubes connecting said knee bolster to a cross tube.

8. The reinforcement structure of claim 7 wherein each of said crush tubes comprises an aluminum-silicon-magnesium alloy of the AA 6000 series.

9. The reinforcement structure of claim 8 wherein said each of crush tubes includes a wall having a thickness of less than about 1.0 mm.

10. The reinforcement structure of claim 7 wherein each of said crush tubes includes a wall defining a circumferentially extending buckle initiator for facilitating buckling upon impact with a vehicle occupant.

11. The reinforcement structure of claim 7 wherein said knee bolster comprises a generally planar metal sheet defining a plurality of cup-shaped indentations.

12. The reinforcement structure of claim 1 wherein said center stack support includes a first sleeve wall defining said first opening and a second sleeve wall defining said second opening, said second sleeve wall including a plurality of radially inwardly extending ridges; said second wall of said driver side cross tube, said second sleeve wall and said ridges defining a plurality of pockets for a polymeric adhesive.

13. The reinforcement structure of claim 1, further comprising a metal first bracket for connecting an end portion of said first wall to a pillar and a metal second bracket for connecting an end portion of said second wall to a pillar.

14. The reinforcement structure of claim 13 wherein each said bracket comprises an aluminum alloy of the AA 6000 series.

15. An instrument panel reinforcement structure suitable for use in a vehicle body and comprising
    (a) a passenger side cross tube comprising a hollow aluminum alloy extrusion having a first wall;
    (b) a driver side cross tube comprising a hollow aluminum alloy extrusion having a second wall thicker than said first wall;
    (c) a center stack support between said passenger side cross tube and said driver side cross tube and comprising a magnesium alloy casting, said support having a first sleeve wall defining a first opening for said first wall and a second sleeve wall defining a second opening for said second wall;
    (d) at least one knee bolster; and
    (e) at least two hollow metal crush tubes connecting said knee bolster to at least one of said driver side cross tube and said passenger side cross tube, each said crush tubes defining a circumferentially extending buckle initiator for initiating buckling upon impact between a knee bolster and a vehicle occupant.

16. The reinforcement structure of claim 15 wherein each of said crush tubes comprises an aluminum alloy of the AA 6000 series.

17. The reinforcement structure of claim 15 wherein said knee bolster comprises a generally planar first metal sheet and a second metal sheet defining a plurality of cup-shaped indentations having flat portions adjacent said first metal sheet.

18. An instrument panel reinforcement structure for a vehicle body, said reinforcement structure comprising:
   (a) a passenger side cross tube comprising a hollow metal body extending in a cross-car direction;
   (b) a driver side cross tube spaced laterally from said passenger side cross tube and extending in a cross-car direction, said driver side cross tube comprising end portions each having a generally oval cross section and a middle portion between the end portions, said middle portion having a generally triangular cross-section; and
   (c) a center stack support between said passenger side cross tube and said driver side cross tube.

19. The reinforcement structure of claim 18 wherein said middle portion has a larger radius of gyration and greater resistance to vibration than said end portions.

20. The reinforcement structure of claim 18 wherein said passenger side cross tube and said driver side cross tube each comprise an aluminum alloy extrusion.

21. The reinforcement structure of claim 18 wherein said passenger side cross tube comprises a first wall and said driver side cross tube comprises a second wall thicker than said first wall.

22. A vehicle body comprising a floor panel, first and second front pillars extending from said floor panel, and an instrument panel reinforcement structure extending between said front pillars and comprising
   (a) a passenger side cross tube comprising a hollow metal extrusion having a first wall;
   (b) a driver side cross tube spaced laterally from said passenger side cross tube and comprising a single hollow metal extrusion having a second wall thicker than said first wall;
   (c) a metal center stack support including a first sleeve wall defining a first opening connected with said first wall and a second sleeve wall defining a second opening connected with said second wall, said second sleeve wall including a plurality of radially inwardly extending ridges; said second wall of said driver side cross tube, said second sleeve wall, and said ridges defining a plurality of pockets for a polymeric adhesive; and
   (d) bracket means connecting said passenger side cross tube with said first front pillar and connecting said driver side cross tube with said second front pillar.

23. The instrument panel reinforcement structure of claim 22, wherein said center stack support further comprises a flange extending downwardly of said first opening and said second opening, said flange defining a through opening for a fastener for connecting the center stack support to said floor panel.

* * * * *